United States Patent
Prikhodko et al.

(10) Patent No.: US 10,627,235 B2
(45) Date of Patent: Apr. 21, 2020

(54) FLEXURAL COUPLERS FOR MICROELECTROMECHANICAL SYSTEMS (MEMS) DEVICES

(71) Applicant: Analog Devices, Inc., Norwood, MA (US)

(72) Inventors: Igor P. Prikhodko, Reading, MA (US); Jeffrey A. Gregory, Malden, MA (US)

(73) Assignee: Analog Devices, Inc., Norwood, MA (US)

( * ) Notice: Subject to any disclaimer, the term of this patent is extended or adjusted under 35 U.S.C. 154(b) by 222 days.

(21) Appl. No.: 15/383,519

(22) Filed: Dec. 19, 2016

(65) Prior Publication Data

US 2018/0172446 A1  Jun. 21, 2018

(51) Int. Cl.
*G01C 19/567* (2012.01)
*G01C 19/574* (2012.01)
*G01C 19/5747* (2012.01)
*G01C 19/5712* (2012.01)

(52) U.S. Cl.
CPC ......... *G01C 19/567* (2013.01); *G01C 19/574* (2013.01); *G01C 19/5712* (2013.01); *G01C 19/5747* (2013.01)

(58) Field of Classification Search
CPC .............. G01C 19/567; G01C 19/5712; G01C 19/5719; G01C 19/5691; G01C 19/5733; G01C 19/574; G01C 19/5747
See application file for complete search history.

(56) References Cited

U.S. PATENT DOCUMENTS

| | | | |
|---|---|---|---|
| 5,241,861 A | 9/1993 | Hulsing, II | |
| 5,392,650 A | 2/1995 | O'Brien et al. | |
| 5,600,064 A | 2/1997 | Ward | |
| 5,635,638 A | 6/1997 | Geen | |
| 5,869,760 A | 2/1999 | Geen | |
| 6,230,563 B1 | 5/2001 | Clark et al. | |
| 6,257,059 B1 | 7/2001 | Weinberg et al. | |

(Continued)

FOREIGN PATENT DOCUMENTS

| | | |
|---|---|---|
| JP | 2011145129 A | 7/2011 |
| JP | 2014-510271 | 4/2014 |
| WO | WO 2012/120190 | 9/2012 |

OTHER PUBLICATIONS

Kranz et al., Micromechanical vibratory rate gyroscopes fabricated in conventional CMOS. Proc. Symposium Gyro Technology. Deutsche Gesellschaft Fuer Ortung Und Navigation, 1997. Stuttgart ,Germany. Sep. 16-17; pp. 3.0-3.8.

(Continued)

*Primary Examiner* — Helen C Kwok
(74) *Attorney, Agent, or Firm* — Wolf, Greenfield & Sacks, P.C.

(57) ABSTRACT

Micromachined inertial devices are presented having multiple linearly-moving masses coupled together by couplers that move in a linear fashion when the coupled masses exhibit linear anti-phase motion. Some of the described couplers are flexural and provide two degrees of freedom of motion of the coupled masses. Some such couplers are positioned between the coupled masses. Using multiple couplers which are arranged to move in linearly opposite directions during linear anti-phase motion of the coupled masses provides momentum-balanced operation.

20 Claims, 14 Drawing Sheets

(56) References Cited

U.S. PATENT DOCUMENTS

| | | | |
|---|---|---|---|
| 6,370,937 B2 | 4/2002 | Hsu | |
| 6,505,511 B1 | 1/2003 | Geen et al. | |
| 6,571,630 B1 | 6/2003 | Weinberg et al. | |
| 6,705,164 B2 | 3/2004 | Willig et al. | |
| 6,752,017 B2 | 6/2004 | Willig et al. | |
| 6,845,668 B2 | 1/2005 | Kim et al. | |
| 6,860,151 B2 | 3/2005 | Platt et al. | |
| 6,877,374 B2 | 4/2005 | Geen | |
| 6,883,361 B2 | 4/2005 | Wyse | |
| 7,032,451 B2 | 4/2006 | Geen | |
| 7,036,373 B2 | 5/2006 | Johnson et al. | |
| 7,204,144 B2 | 4/2007 | Geen | |
| 7,222,533 B2 | 5/2007 | Mao et al. | |
| 7,227,432 B2 * | 6/2007 | Lutz | H03H 3/0076 310/309 |
| 7,284,429 B2 * | 10/2007 | Chaumet | G01C 19/5747 73/504.12 |
| 7,287,428 B2 | 10/2007 | Green | |
| 7,313,958 B2 | 1/2008 | Willig et al. | |
| 7,347,094 B2 | 3/2008 | Geen et al. | |
| 7,421,897 B2 * | 9/2008 | Geen | G01C 19/574 73/504.12 |
| 7,675,217 B2 | 3/2010 | Delevoye et al. | |
| 8,096,181 B2 * | 1/2012 | Fukumoto | G01C 19/56 73/504.12 |
| 8,266,961 B2 | 9/2012 | Kuang et al. | |
| 8,322,213 B2 * | 12/2012 | Trusov | G01C 19/5747 73/504.12 |
| 8,342,023 B2 * | 1/2013 | Geiger | G01C 19/574 73/504.12 |
| 8,354,900 B2 | 1/2013 | Cazzaniga et al. | |
| 8,453,504 B1 | 6/2013 | Mao | |
| 8,490,483 B2 | 7/2013 | Wrede et al. | |
| 8,539,832 B2 | 9/2013 | Potasek et al. | |
| 8,656,776 B2 | 2/2014 | Trusov et al. | |
| 8,783,105 B2 | 7/2014 | Kuhlmann et al. | |
| 8,794,067 B2 | 8/2014 | Schmid et al. | |
| 8,844,357 B2 * | 9/2014 | Scheben | G01C 19/5747 73/504.12 |
| 8,991,247 B2 * | 3/2015 | Trusov | G01C 19/5719 73/504.12 |
| 9,212,908 B2 * | 12/2015 | Geen | G01C 19/5719 |
| 9,217,756 B2 * | 12/2015 | Simon | G01P 15/097 |
| 9,493,340 B2 | 11/2016 | Mahameed et al. | |
| 10,317,210 B2 * | 6/2019 | Kub | G01C 19/5684 |
| 10,415,968 B2 | 9/2019 | Prikhodko et al. | |
| 2006/0213265 A1 | 9/2006 | Weber et al. | |
| 2007/0062282 A1 * | 3/2007 | Akashi | G01C 19/5719 73/504.12 |
| 2008/0282833 A1 | 11/2008 | Chaumet | |
| 2009/0223277 A1 | 9/2009 | Rudolf et al. | |
| 2012/0060604 A1 * | 3/2012 | Neul | G01C 19/574 73/504.12 |
| 2012/0125099 A1 * | 5/2012 | Scheben | G01C 19/5747 73/504.12 |
| 2012/0210788 A1 | 8/2012 | Günther et al. | |
| 2012/0222483 A1 | 9/2012 | Blomqvist et al. | |
| 2013/0192363 A1 | 8/2013 | Loreck | |
| 2013/0269413 A1 | 10/2013 | Tao et al. | |
| 2014/0190258 A1 | 7/2014 | Donadel et al. | |
| 2014/0260608 A1 | 9/2014 | Lin et al. | |
| 2015/0285633 A1 | 10/2015 | Kamal Said Abdel Aziz et al. | |
| 2015/0330783 A1 * | 11/2015 | Rocchi | G01C 19/5747 73/504.12 |
| 2016/0025493 A1 | 1/2016 | Stewart | |
| 2016/0264404 A1 | 9/2016 | Acar | |
| 2016/0316146 A1 | 10/2016 | Kajimura | |
| 2016/0349056 A1 | 12/2016 | Thompson et al. | |
| 2018/0058853 A1 | 3/2018 | Jia et al. | |
| 2018/0172445 A1 * | 6/2018 | Prikhodko | G01C 19/5712 |
| 2018/0172447 A1 * | 6/2018 | Prikhodko | G01C 19/5747 |
| 2019/0310087 A1 | 10/2019 | Gregory et al. | |

OTHER PUBLICATIONS

Kranz, Design, Simulation and Implementation of Two Novel Micromechanical Vibratory-Rate Gyroscopes. Department of Electrical and Computer Engineering. Carnegie Mellon University. May 1988. 41 pages.

Prikhodko et al., Foucault Pendulum on a Chip: Angle Measuring Silicon Mems Gyroscope. 2011 IEEE 24th International Conference on Micro Electro Mechanical Systems (MEMS 2011), Cancun, Mexico. Jan. 23-27, 2011;161-4.

Trusov et al., Flat Is Not Dead: Current and Future Performance of Si-MEMS Quad Mass Gyro (QMG) System. 2014 IEEE/ION Position, Location and Navigation Symposium. (PLANS 2014). May 5-8, 2014. 7 pages.

Trusov et al., Force Rebalance, Whole Angle, and Self-Calibration Mechanization of Silicon MEMS Quad Mass Gyro. IEEE 2014 International Symposium on Inertial Sensors and Systems (ISISS). Feb. 25-26, 2014;149-50.

Kumar et al., Amplitude modulated Lorentz force MEMS magnetometer with picotesla sensitivity. Journal of Micromechanics and Microengineering. Sep. 20, 2016; 26(10): http://iopscience.iop.org/article/10.1088/0960-1317/26/10/105021/meta#fnref-jmmaa3949bib003.

Li et al., Three-Axis Lorentz-Force Magnetic Sensor for Electronic Compass Applications. Journal of Microelectromechanical Systems. Aug. 2012;21(4):1002 http://ieeexplore.ieee.org/stamp/stamp.jsp?arnumber=6198750.

Park et al., Dynamics and control of a MEMS angle measuring gyroscope. Sensors and Actuators A: Physical 144.1 (2008): 56-63.

Zaman et al., A mode-matched silicon-yaw tuning-fork gyroscope with subdegree-per-hour Allan deviation bias instability. Journal of Microelectromechanical Systems 17.6 (2008): 1526-36.

\* cited by examiner

FLEXURAL COUPLERS FOR MICROELECTROMECHANICAL SYSTEMS (MEMS) DEVICES

FIELD OF THE DISCLOSURE

This disclosure relates to microelectromechanical systems (MEMS) devices having multiple moving masses.

BACKGROUND

Gyroscopes (sometimes referred to simply as "gyros") are devices which are sensitive to rotation, and therefore which can be used to detect rotation. Microelectromechanical systems (MEMS) gyroscopes typically include a movable body, sometimes referred to as a "proof mass," to which an electrical signal is applied to produce motion predominantly along a particular axis. This is referred to as driving the proof mass, and the axis along which the proof mass is driven is sometimes referred to as the "drive axis." When the gyroscope experiences rotation, the proof mass additionally moves along an axis different than the drive axis, sometimes referred to as the sense axis. For some MEMS gyroscopes, rotation causes the proof mass to move linearly along the sense axis. For others, rotation causes the proof mass to rotate. The motion of the proof mass along the sense axis is detected, providing an indication of the rotation experienced by the gyroscope.

Some MEMS gyroscopes include multiple proof masses that are mechanically coupled together. The proof masses can be coupled together in an attempt to provide synchronous motion while rejecting undesired motion in either the sense or drive axes.

SUMMARY OF THE DISCLOSURE

Micromachined inertial devices are presented having multiple linearly-moving masses coupled together by couplers that move in a linear fashion when the coupled masses exhibit linear anti-phase motion. Some of the described couplers are flexural and provide two degrees of freedom of motion of the coupled masses. Some such couplers are positioned between the coupled masses. Using multiple couplers which are arranged to move in linearly opposite directions during linear anti-phase motion of the coupled masses provides momentum-balanced operation.

In certain embodiments, a microelectromechanical systems (MEMS) device having multiple coupled masses is provided, comprising first and second proof masses each configured to move linearly, and a coupler coupling the first and second proof masses together and configured to move linearly when the first and second proof masses move in linear anti-phase motion.

In certain embodiments, a synchronized mass microelectromechanical systems (MEMS) gyroscope is provided, comprising first, second, third, and fourth proof masses arranged in a planar proof mass arrangement and coupled together. The synchronized mass MEMS gyroscope further comprises a flexural coupler disposed between the first, second, third, and fourth proof masses and coupled to the first, second, third, and fourth proof masses such that the first, second, third, and fourth proof masses exhibit linear anti-phase motion when the coupler moves linearly.

In certain embodiments, a method of operating a microelectromechanical systems (MEMS) device having multiple coupled masses is provided, comprising moving a first proof mass and second proof mass linearly in anti-phase motion, and linearly translating a first coupler coupling the first and second proof masses as the first and second proof masses move linearly in anti-phase motion.

In certain embodiments, a synchronized mass gyroscope is provided, comprising first, second, third, and fourth proof masses arranged in a common plane, a flexural coupler disposed in-plane with and between the four proof masses and coupling the four proof masses together in a manner enforcing linear anti-phase motion of the four proof masses. The flexural coupler comprises a first beam extending between the first and second proof masses and a second beam extending between the second and third proof masses. The first and second beams are coupled together at least in part by a unidirectional spring which decouples linear motion of the first beam from linear motion of the second beam.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application provide motion transfer and coupling mechanisms configured to allow or enforce linear anti-phase motion between coupled proof-masses of an inertial microelectromechanical systems (MEMS) device. In some embodiments, the motion transfer and coupling mechanisms allow for two degrees of freedom (2DOF).

According to an aspect of the present application, a coupler is placed between and couples together four proof masses of a MEMS device. The coupler moves linearly in two decoupled degrees of freedom, and enforces linear anti-phase motion of the four coupled proof masses in two different directions. The coupler may be fabricated from the same layer(s) of material as the proof masses, and thus may be a planar coupler in at least some situations. The coupler may include at least one flexural portion, and one or more linearly moving bars or beams. Linear motion of the coupler in the two degrees of freedom may be decoupled by the flexural portion.

According to an aspect of the present application, two or more linearly moving couplers are used in combination in a MEMS device to provide momentum balanced operation while enforcing linear anti-phase motion of the coupled masses. In some such situations, one of the couplers may be an inner coupler positioned between the coupled proof masses, and one or more additional couplers may be positioned at the periphery, or exterior to, the arrangement of coupled proof masses. The couplers may have substantially the same mass but be configured to move linearly in opposite directions, thus providing momentum balanced operation.

A variety of MEMS devices may implement the linearly moving motion transfer and coupling mechanisms described herein. For example, resonators, gyroscopes, and accelerometers may make use of the couplers described herein. The MEMS devices may include two coupled masses, four coupled masses, or other suitable numbers of coupled masses. As a non-limiting example, a synchronized mass gyroscope having four coupled masses may make use of the various types of linearly moving motion transfer and coupling mechanisms described herein. According to an embodiment of the application, a synchronized mass gyroscope includes an inner coupler positioned between and coupling together the four proof masses. The inner coupler is formed from the same layer(s) of material as the proof masses, and moves linearly in two de-coupled directions of motion, enforcing linear anti-phase motion of the coupled proof masses. The inner coupler may therefore enforce linear anti-phase motion in both drive and sense modes of operation of the gyroscope. Multiple additional linearly moving couplers are provided at the periphery of the proof mass arrangement to provide momentum balanced operation.

Figure 1:
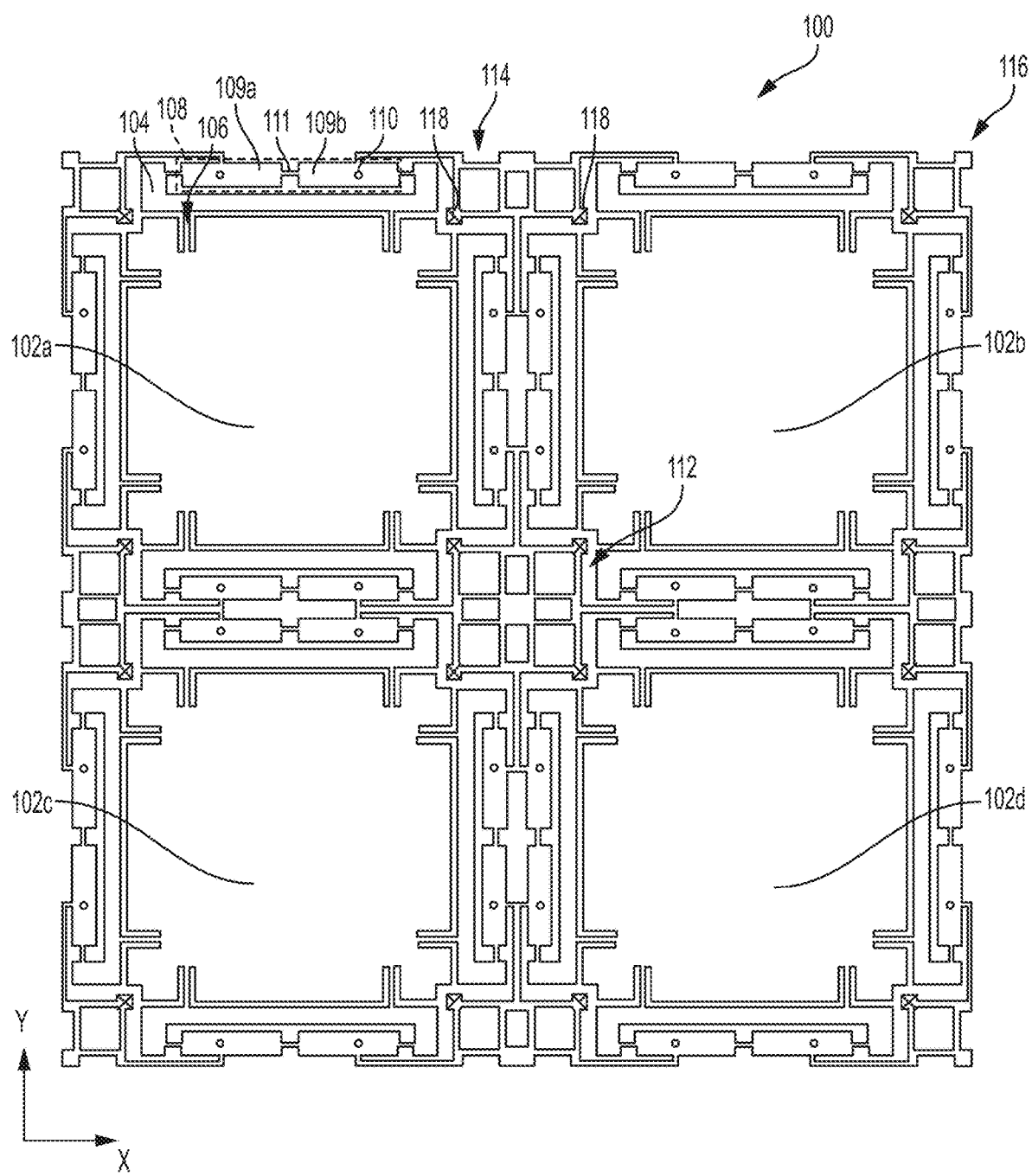
FIG. 1 illustrates a planar multiple-mass microelectromechanical systems (MEMS) device having linearly moving couplers coupling the masses of the device, according to a non-limiting embodiment.

FIG. 1 illustrates a MEMS device 100 having multiple masses coupled together by couplers configured to move linearly during linear anti-phase motion of the coupled masses. The MEMS device 100 may be a synchronized mass gyroscope, as a non-limiting example.

The MEMS device 100 includes four proof masses 102a, 102b, 102c, and 102d. Each of the four proof masses 102a-102d is coupled to four shuttles 104 by two tethers 106. A pivoting linkage 108 is associated with each of the illustrated shuttles 104 in this non-limiting example. The pivoting linkage is configured to pivot in the xy-plane about pivot points 110. The MEMS device 100 further includes three types of linearly moving couplers 112, 114, and 116. Coupler 112 is positioned between and couples together all four of the proof masses 102a-102d. The couplers 114 couple together two neighboring proof masses. For example, one of the couplers 114 couples together proof masses 102a and 102b. The couplers 116 are each coupled to a single proof mass in this non-limiting example. The MEMS device 100 includes a single instance of coupler 112, four instances of coupler 114, and four instances of coupler 116.

The couplers 112, 114, and 116 all enforce linear anti-phase motion of the proof masses 102a-102d, which may be considered the primary mode of operation of the MEMS device 100, and all allow for two degrees of freedom (DOF) of motion. In this non-limiting example, the couplers 112, 114, and 116 all allow motion in both the x and y-directions.

The proof masses 102a-102d may have any suitable size and shape, and may be formed of any suitable material(s). In some embodiments, the proof masses 102a-102d are substantially rectangular, and in some embodiments are substantially square. They may be formed of silicon, or another suitable material. The proof masses 102a-102d may be substantially identical in at least some embodiments.

The shuttles 104 are movable, and are also optional. They may be included to suppress misalignment of the drive force and/or misalignment of the sense force (assuming the MEMS device 100 is a gyroscope) by resisting motion orthogonal to the desired motion. However, not all embodiments include such shuttles. Some embodiments include proof masses, pivoting linkages, and linearly moving couplers, but no shuttles. The proof mass may be directly coupled to the pivoting linkage in such embodiments. Also, the shuttles may assume various forms, and the form illustrated in FIG. 1 is a non-limiting example. An alternative is described below in connection with FIG. 7.

As shown in FIG. 1, the proof masses 102a-102d are coupled to the shuttles 104 by tethers 106, which may take any suitable form, such as a straight flexural beam. As an alternative, the tethers 106 may be folded tethers. The tethers 106 coupled to the proof masses may have a suitable configuration in combination to allow motion of the proof masses in two directions, for example along the x and y-directions.

The pivoting linkages 108 are included to reduce or entirely eliminate quadrature, and may be considered one example of a quadrature suppression mechanism. Quadrature is the motion of the proof masses in the direction orthogonal to the drive motion, which is ideally 90° out of phase with the Coriolis response. Typically, quadrature is undesirable, as the gyroscope may be unable to distinguish between electrical signals resulting from quadrature and those resulting from rotation, and thus the accuracy of the gyroscope at detecting rotation may be negatively impacted by the occurrence of quadrature.

Each of the illustrated pivoting linkages 108 includes two segments 109a and 109b connected by a connector 111. The two segments 109a and 109b of the pivoting linkage 108 may be of substantially equal length. When the connector 111 is straight, the two segments 109a and 109b of the pivoting linkage in combination with the connector 111 form a substantially rigid bar. When a shuttle moves linearly away from a given pivoting linkage, the pivoting linkage may flex (or bend) because the connector 111 may flex. The pivoting linkages 108 may pivot about the pivot points 110 in response to the shuttles 104 being driven as well as in response to the shuttles 104 moving as a result of experiencing a Coriolis force. However, the connector 111 may resist torsion and/or shear, thereby inhibiting tilt of the pivoting linkage and preventing rotation of the shuttle 104 (and the mass connected to it). The pivoting linkage 108 reduces or prevents entirely quadrature motion of the gyroscope by inhibiting unwanted rotation or tilt of the shuttle (and the mass connected to it), while allowing the desired linear motion.

Couplers 112, 114, and 116 move in a linear fashion to allow or enforce linear anti-phase motion of the proof masses 102a-102d. Linear anti-phase motion of the proof masses is illustrated in a simplified block diagram form in FIGS. 2A and 2B. For purposes of explanation, it is assumed that the MEMS device 100 is a gyroscope and that the x-axis represents the drive axis along which the proof masses 102a-102d are driven, with the y-axis representing the sense axis along which the proof masses 102a-102d move in response to a Coriolis force associated with rotation of the MEMS device 100 in the plane of the page.

Figure 2A:
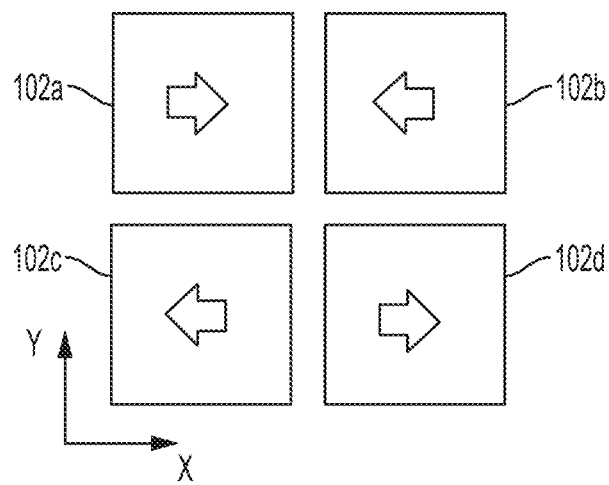
FIG. 2A illustrates in block diagram form an example of linear anti-phase motion of the masses of the device of FIG. 1 in a first mode of operation, according to a non-limiting embodiment.

FIG. 2A illustrates in block diagram form an example of anti-phase motion of the proof masses 102a-102d in a drive mode of operation, according to a non-limiting embodiment. As illustrated, the motion of proof masses 102a-102d is anti-phase in that the motion of any given mass of the four is in an opposite direction to that of the two direct neighboring masses. In the illustrated non-limiting example, proof masses 102a and 102d move linearly in the x-direction while proof masses 102b and 102c move linearly in the negative x-direction. The motion may be synchronous in that motion of one of the proof masses may cause motion of the others.

Figure 2B:
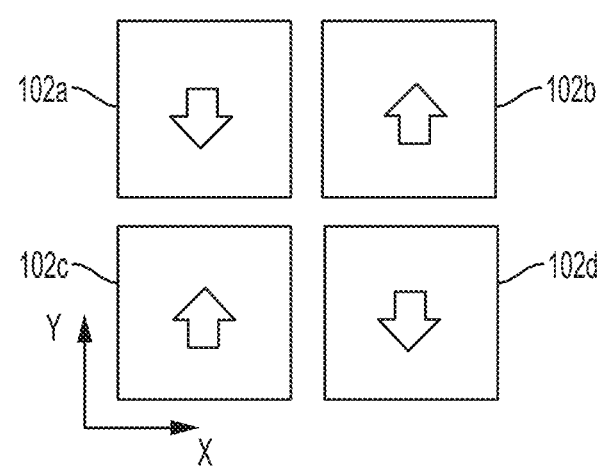
FIG. 2B illustrates in block diagram form an example of linear anti-phase motion of the masses of the device of FIG. 1 in a second mode of operation, according to a non-limiting embodiment.

FIG. 2B illustrates in block diagram form an example of anti-phase motion of the proof masses 102a-102d in a sense mode of operation, according to a non-limiting embodiment. Again, the illustrated motion is anti-phase. In this non-limiting example, proof masses 102a and 102d move linearly in the negative y-direction while proof masses 102b and 102c move linearly in the y-direction. Again, the motion may be synchronous in that motion of one of the proof masses may cause motion of the others.

While FIGS. 2A-2B illustrate linear motion of the proof masses in the up-down and left-right directions, it should be appreciated that any combination of such motion may be implemented by a MEMS device. For example, the motion of the proof masses may instead be along a diagonal direction (e.g., at 45 degrees to the x and y-axes), among other possibilities. For example, the drive axis may be at 45° to the x-axis and the sense axis may be at 135° to the x-axis. Other orientations are possible. Also, while FIG. 2A is described as relating to a drive mode of operation and FIG. 2B a sense mode, it should be appreciated that the drive and sense directions may be reversed. In general, it should be appreciated that FIGS. 2A-2B merely represent an example of linear anti-phase motion which may be implemented by a MEMS device having four movable masses, and that the directions of motion and designation of drive and sense modes may take various forms.

The couplers 112 and 114 prioritize anti-phase motion of the proof masses 102a-102d, while rejecting spurious modes such as common mode and rotary motion of the proof masses. In doing so, the MEMS device may be substantially insensitive or immune to linear acceleration and angular acceleration, thus providing more accurate operation of the MEMS device as a gyroscope. The couplers 112 and 114 may enforce the linear anti-phase motion by mode ordering the modes of the MEMS device such that those modes susceptible to external forces are at significantly higher frequencies than the desired modes of operation. In this manner, spurious modes may be rejected.

Referring again to FIG. 1, coupler 112 is placed between, and couples, the four proof masses 102a-102d. The structure of coupler 112 is described in further detail below in connection with FIG. 3A. The coupler 112 includes an inner flexural (or "compliant" or "bendable") portion comprising a plurality of beams between four anchors, effectively forming a flexural square. These beams are compliant in the direction of the coupling bar (e.g., bars 306a-306d in FIG. 3A) and rigid in the orthogonal direction. The coupler 112 further includes four bars extending outwardly from respective sides of the flexural square which are substantially rigid in the direction of coupling and compliant in the orthogonal direction. As will be described further below in connection with FIGS. 3A-3C, the coupler 112 is configured to decouple linear motion in orthogonal directions, in this case the x and y-directions. That is, the motion of the coupler along the x-direction does not induce motion of the coupler 112 along the y-direction, and vice versa. The coupler 112 also independently transfers motion between the outwardly extended bars, so that linear motion of one bar is transferred to the neighboring bar in the same direction, without affecting the other bars in the orthogonal direction. While the flexural square facilitates the decoupling of the motion in the two degrees of freedom, the motion transfer is accomplished through a center portion of the coupler 112 including the mass and additional eight flexures forming an inside flexural cross inside the flexural square. Similar to the flexural square, the inside flexural cross also facilitates the decoupling of the motion in the two degrees of freedom.

In the non-limiting example illustrated, the four substantially rigid bars of the coupler 112 couple to pivoting linkages 108. More specifically, in the example illustrated, each of the four rigid bars of the coupler 112 couples to one segment of each of two of the pivoting linkages 108. However, other configurations of the coupler 112 and its connections to the proof masses are possible and are described further below.

The coupler 114 is effectively one-half of the coupler 112, and is positioned to couple two of the proof masses. It may be considered an outer (or "exterior") coupler because it is disposed at the periphery of the arrangement of the four proof masses 102a-102d. There is one coupler 114 coupling proof masses 102a and 102b, another coupler 114 coupling proof masses 102b and 102d, another coupler 114 coupling proof masses 102a and 102c, and a fourth coupler 114 coupling proof masses 102c and 102d. Each of the couplers 114 includes a flexural portion and a substantially rigid bar.

The coupler 116 is effectively one-quarter of the coupler 112. The couplers 116 include a single anchor and are arranged at the outermost corners of the proof masses 102a-102d.

It should be appreciated that couplers 112, 114, and 116 are planar. They may be formed of the same material as the proof masses 102a-102d. For example, all the structures shown in FIG. 1 may be formed by suitable patterning from a common layer, such as silicon, or common stack of layers. Thus, considering coupler 112 as an example, aspects of the present application provide a planar linearly moving coupler which couples together multiple proof masses to provide linear anti-phase motion of the coupled proof masses in two decoupled degrees of freedom. Further detail is provided below in connection with FIGS. 3A-3C.

The MEMS device 100 further comprises anchors 118 provided at various locations. There are sixteen anchors in the non-limiting example illustrated, but other numbers may be used. The anchors may be posts or other structures coupled to an underling substrate. For example, the illustrated structures of MEMS device 100 may be formed from, and suspended above, an underlying silicon substrate. The anchors 118 may extend from the illustrated layer down to the underlying substrate.

The MEMS device 100 may further comprise structures for providing and detecting signals. For example, forcer (or drive) electrodes and sensing (or pick-off) electrodes may be provided at suitable positions. For simplicity of illustration, those structures are not shown.

Figure 3A:
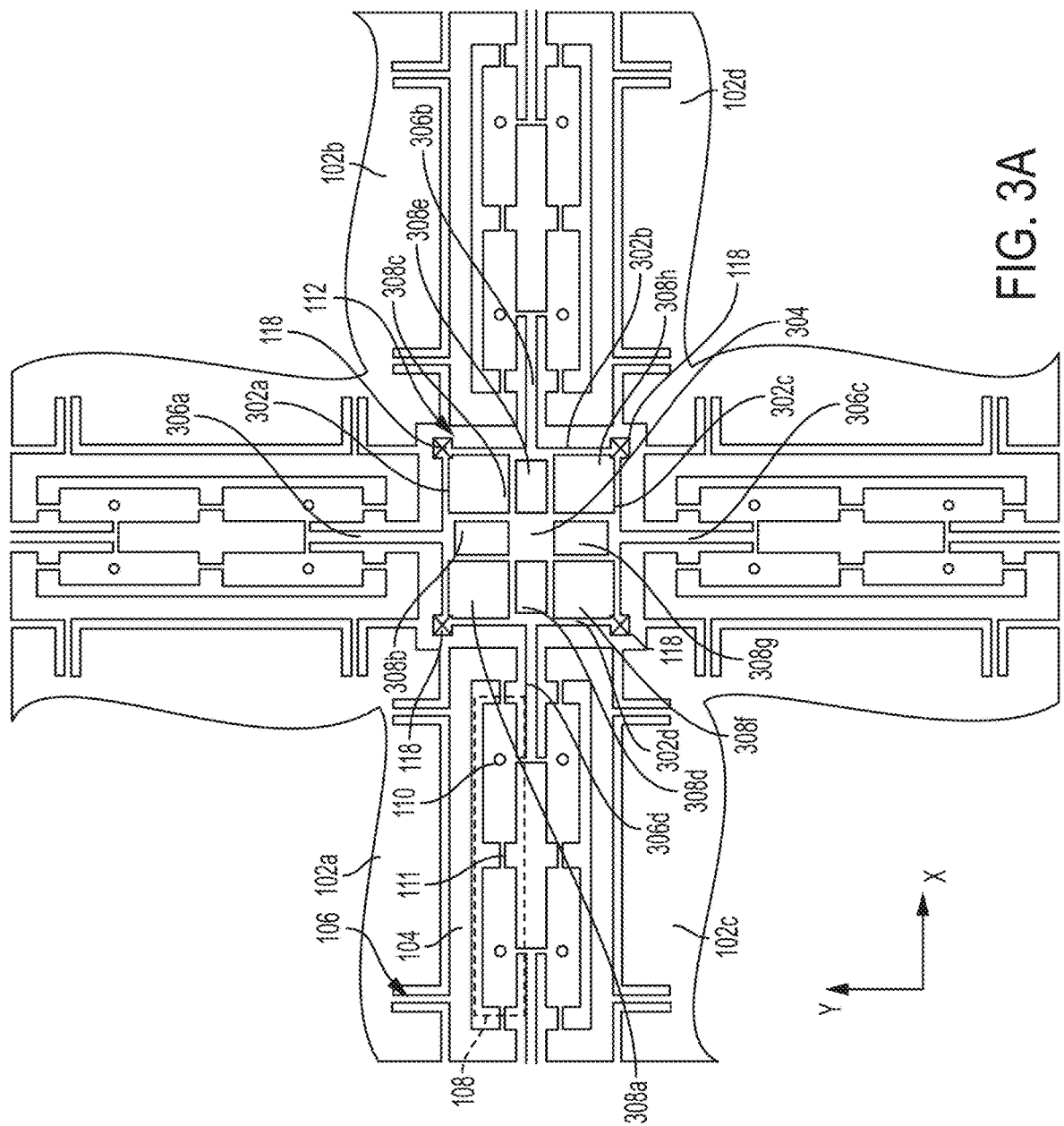
FIG. 3A is a detail of the device of FIG. 1, illustrating an internal coupler coupling the four proof masses and providing two degrees of freedom of motion.

FIG. 3A is a detail of the device of FIG. 1, omitting some of the structures of MEMS device 100 to simplify illustration and description of the coupler 112. The proof masses 102a-102d are shown only partially, as represented by the non-linear boundary lines.

As shown, the coupler 112 includes a central flexural portion formed by beams 302a, 302b, 302c, and 302d arranged between four anchors 118. An inside flexural cross 304 is disposed inside the boundary defined by beams 302a-302d, and provides coupling between them. The coupler 112 further comprises four bars 306a, 306b, 306c, and 306d, which project outwardly from respective beams 302a-302d. The bars 306a-306d are configured to be selectively rigid, coupling linear motion along a single axis. As will be described further below in connection with FIGS. 3B and 3C, the bars 306a and 306c move linearly along the y-direction and the bars 306b and 306d move linearly along the x-direction. The motion along the x and y-directions is decoupled from each other by the configuration of beams 302a-302d and inside flexural cross 304. In this manner, coupler 112 provides two decoupled degrees of freedom of linear motion.

The flexural square decouples the drive and sense motion. The coupling and transfer of motion between the proof masses 102a-102d is provided by the bars 306a-306d. For example, the transfer of motion from bar 306a to bar 306c is accomplished by the inside flexural cross 304 formed by a mass and the beams connecting the mass to the flexural square. The beams forming the inside cross, which are separated by the gaps 308a, 308b, 308c, 308d, 308e, 308f, 308g, and 308h, are compliant in one direction and rigid in the orthogonal direction, so that when motion is transferred in one direction it does not impact the orthogonal motion. Thus, motion of bars 306a and 306c does not disturb bars 306b and 306d from equilibrium. Likewise, motion of bars 306b and 306d does not disturb bars 306a and 306c from equilibrium.

Figure 3B:
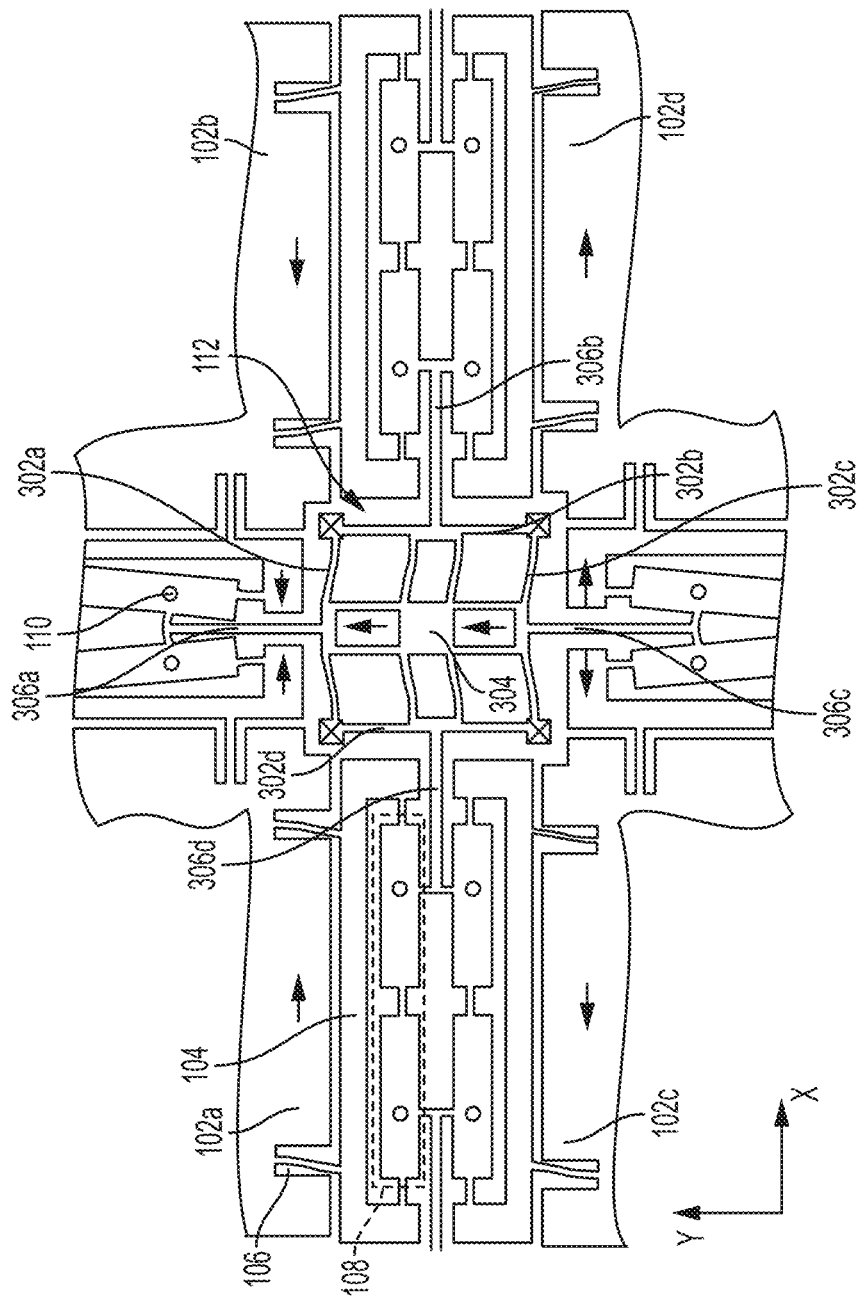
FIG. 3B illustrates deformation of the device of FIG. 3A during a first state of operation in which the proof masses exhibit linear anti-phase motion along the x-direction.
Figure 3C:
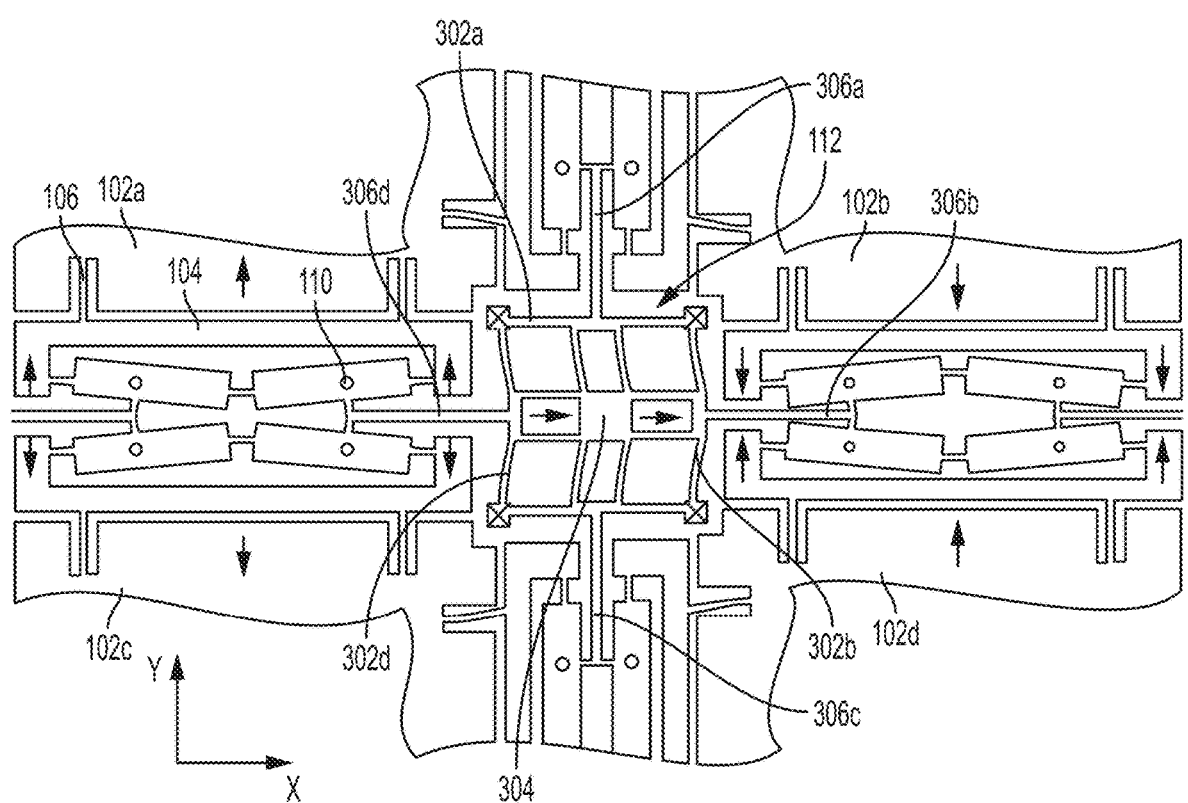
FIG. 3C illustrates deformation of the device of FIG. 3A during a second state of operation in which the proof masses exhibit linear anti-phase motion along the y-direction.
Figure 4A:
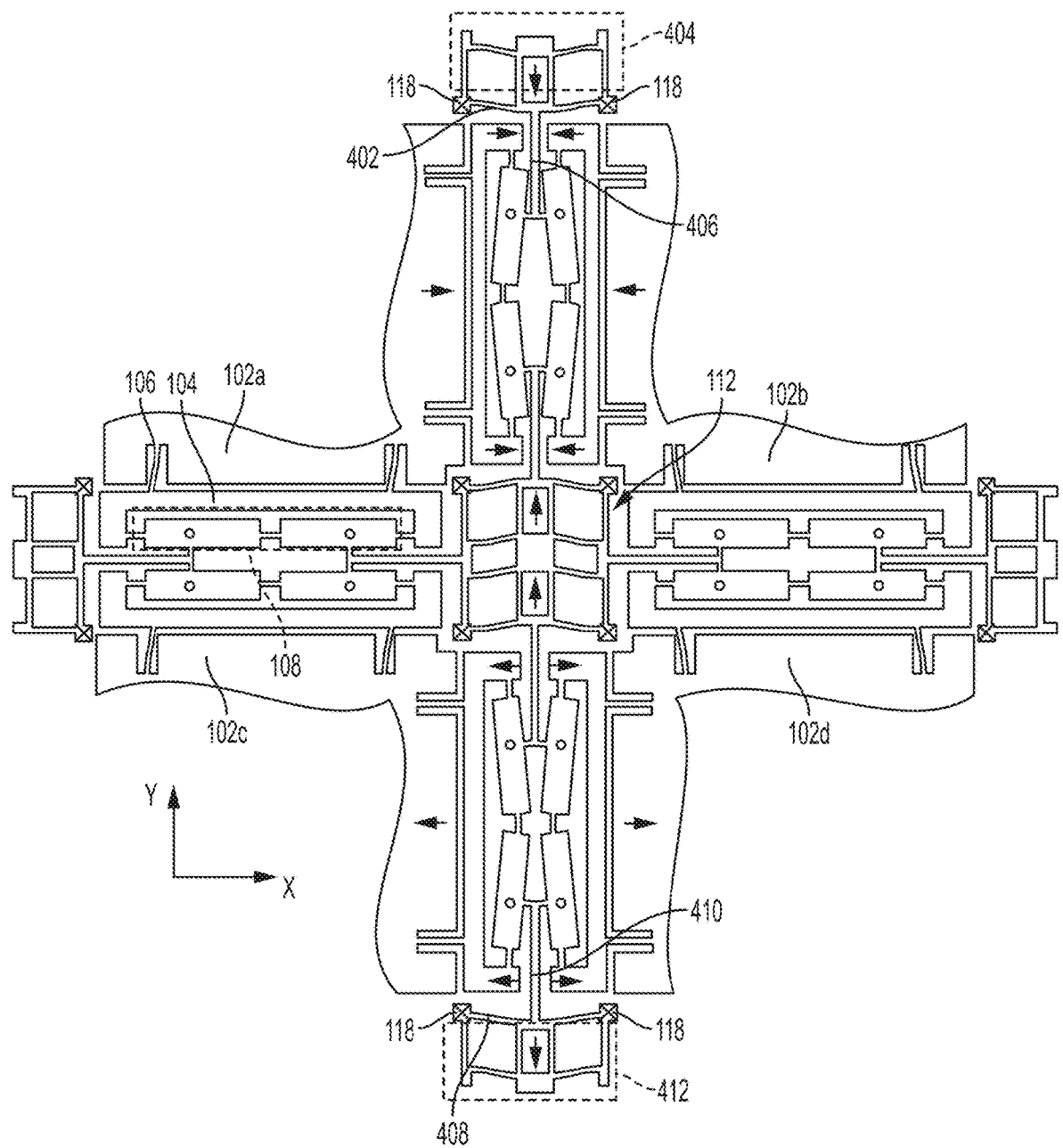
FIGS. 4A-4B illustrate two different states of deformation of a different detail of the device of FIG. 1 than those shown in FIGS. 3A-3B, showing balanced couplers in addition to the inner coupler illustrated in FIGS. 3A-3B.
Figure 4B:
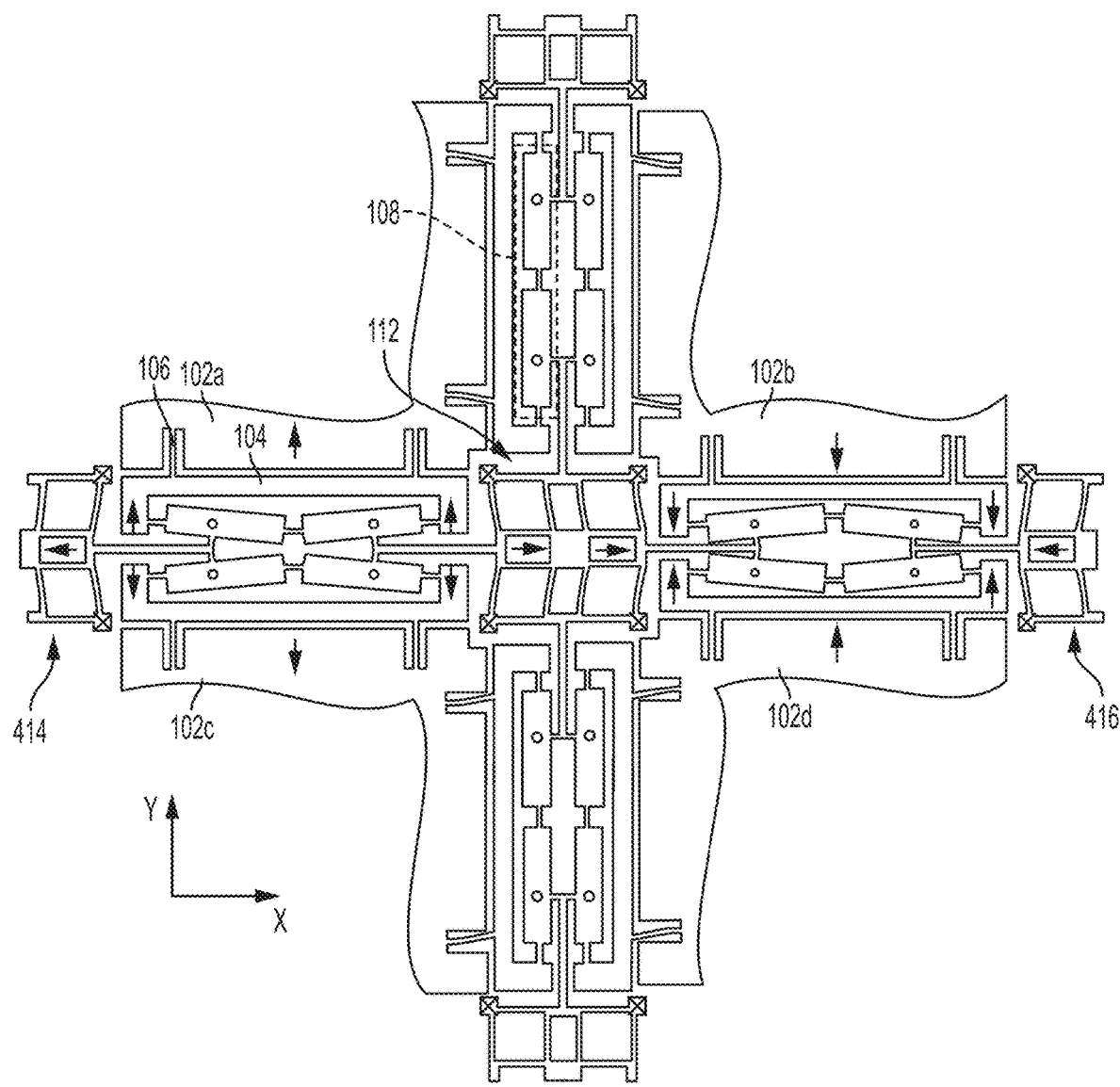

FIG. 3B illustrates deformation of the device of FIG. 3A during a first state of operation in which the proof masses exhibit linear anti-phase motion along the x-direction. As an example, the illustrated motion may represent the drive mode of operation of the MEMS device, when the proof masses are driven along the x-direction. However, it should be appreciated that, as previously described in connection with FIGS. 2A-2B, designation as drive or sense mode may be reversed and is not limiting. Also, the linearly moving couplers described herein may be used for devices which may not have a drive mode, but in which it is still desirable to enforce linear anti-phase motion of coupled proof masses. The direction of motion in this figure, as well as in FIGS. 3C, 4A, and 4B, is illustrated by the bold arrows.

In the illustrated state of deformation, the proof masses 102a and 102d have moved to the right, in the positive x-direction, relative to their equilibrium positions. The proof masses 102b and 102c have moved to the left, in the negative x-direction, from their equilibrium positions. The beams 302a and 302c of coupler 112 flex upward, in the positive y-direction. As a result, bars 306a and 306c of the coupler 112 are displaced in the positive y-direction from their equilibrium positions. The inside flexural cross 304 of the coupler 112 also is displaced in the positive y-direction from its equilibrium position, transferring the motion from the bar 306a to the bar 306c.

When the proof masses 102a-102d reverse their respective directions, the coupler 112 does so as well. That is, when the proof masses 102a and 102d are displaced in the negative x-direction from their equilibrium positions and the proof masses 102b and 102c are displaced in the positive x-direction from their equilibrium positions, the beams 302a and 302c of coupler 112 will flex downward in the negative y-direction, thus displacing the bars 306a and 306c of the coupler 112 in the negative y-direction.

When the bars 306a and 306c move linearly as part of the illustrated operation, the pivoting linkages to which they couple rotate about their respective pivot points 110 as shown, thus driving the masses 102a and 102b outwards in the x-direction and the masses 102c and 102d inwards in the x-direction, thereby ensuring a synchronized, anti-phase operation.

It should be noted that in the state of deformation of FIG. 3B, the coupler 112 does not deflect in the x-direction. Rather, the deflection of the coupler 112 is along the y-direction, with the beams 302b and 302d and bars 306b and 306d remaining substantially or completely stationary. Thus, the motion of the coupler 112 in the y-direction is decoupled from any motion of the coupler in the x-direction. This feature further facilitates provision of synchronous anti-phase motion of the proof masses 102a-102d. Also, it should be noted that the proof masses 102a-102d move linearly along a direction orthogonal to the motion of the coupler 112. This is due to the pivoting linkages 108, which translate linear motion in one direction (e.g., the linear motion of the proof masses along one direction) to linear motion in an orthogonal direction (e.g., the linear motion of the coupler along a direction orthogonal to that of the proof masses).

FIG. 3C illustrates deformation of the device of FIG. 3A during a second state of operation in which the proof masses exhibit linear anti-phase motion along the y-direction. The illustrated deformation may represent a sense mode of operation of the MEMS device, as a non-limiting example. Here, the proof masses 102a and 102d are displaced in the positive y-direction relative to their equilibrium positions, and the proof masses 102b and 102c are displaced in the negative y-direction from their equilibrium positions.

The beams 302b and 302d of the coupler 112 deflect, or flex, in the positive x-direction. Thus, the bars 306b and 306d move linearly in the positive x-direction from their equilibrium positions. It should be noted that the beams 302a and 302c and bars 306a and 306c of the coupler 112 do not move during this mode of operation, further illustrating the decoupled manner of the x and y-direction linear motion of the coupler 112.

When the proof masses 102a-102d reverse their respective directions, the coupler 112 does so as well. That is, when the proof masses 102a and 102d are displaced in the negative y-direction from their equilibrium positions and the proof masses 102b and 102c are displaced in the positive y-direction from their equilibrium positions, the beams 302b and 302d of coupler 112 will flex leftward in the negative x-direction, thus displacing the bars 306b and 306d of the coupler 112 in the negative x-direction.

Considering FIGS. 3A-3C, it should be appreciated that the coupler 112 is a flexural, or bendable, coupler which is positioned between and couples the four proof masses 102a-102d in a manner providing linear, synchronized anti-phase motion of the proof masses. The two degrees of freedom of motion provided (in the x and y-directions in the non-limiting example of FIGS. 3A-3C) are decoupled from each other.

It is also noteworthy that the coupler 112 is positioned between the four coupled proof masses 102a-102b, rather than at a perimeter of the proof mass arrangement. In this manner, the coupler 112 may save real estate on the chip on which the MEMS device 100 is formed. Additionally, some effects of microfabrication imperfections may be reduced or eliminated. Microfabrication techniques used to make micromachined devices, such as lithography and etching, often vary across a wafer or a die/chip. Therefore, couplers placed at the periphery of a proof mass arrangement may inadvertently have different dimensions. By contrast, the coupler 112 is relatively compact, and does not extend across a large distance of the chip. Therefore, manufacturing imperfections may be reduced.

While the coupler 112 is shown as providing two degrees of freedom, alternative couplers described herein may move linearly and enforce linear anti-phase motion of coupled proof masses in only one degree of freedom. For example, omitting the bars 306b and 306d of the coupler 112 would result in the coupler providing synchronous anti-phase motion of the proof masses 102a-102d in the x-direction, but not in the y-direction. Thus, for instance, the drive mode of operation of the MEMS device 100 may be coupled, and the sense mode uncoupled. Alternatively, the bars 306a and 306c may be omitted. In such a situation, the coupler would provide synchronous linear anti-phase motion in the y-direction, and not in the x-direction. While it may be desirable in some embodiments to use a coupler coupling motion in two degrees of freedom, alternative embodiments may include linearly moving couplers which enforce linear anti-phase motion in a single degree of freedom.

As can be seen from FIGS. 3B-3C, use of a single coupler 112 is sufficient in some embodiments to enforce linear anti-phase motion of the coupled proof masses 102a-102d. However, motion of the coupler 112 by itself provides momentum imbalance. For example, referring to FIG. 3B, the coupler 112 provides a net momentum in the positive y-direction, while in FIG. 3C the coupler 112 provides a net momentum in the positive x-direction. This non-zero momentum may be undesirable in at least some embodiments. Thus, a momentum-balanced system may be used in some embodiments.

FIG. 4A illustrates a different detail of the device of FIG. 1 than that shown in FIG. 3A, showing momentum-balanced couplers in addition to the inner coupler 112 illustrated in the detail of FIG. 3A. The momentum balanced couplers are a portion of the coupler 114. As shown, one includes a beam 402 between two anchors 118, and a bar 406 extending away from the coupler and between the proof masses 102a and 102b. The coupler also includes a flexural rectangle shown generally by the dashed box 404. The structure of FIG. 4A includes three additional instances of the same coupler structure, including a coupler comprising a beam 408 between two anchors 118, a bar 410 extending between the proof masses 102c and 102d, and a mass structure shown generally by the dashed box 412. These couplers may be referred to herein as "outer couplers," "exterior couplers," or "end couplers" owing to their positioning relative to the arrangement of the four proof masses 102a-102d. In FIGS. 4A-4B, the end couplers move in one direction, equally and opposite to the direction of coupler 112, providing momentum balance. The same outer coupler is free to move in the orthogonal direction, as shown in FIG. 1, where it balances the motion of the corner coupler 116.

FIG. 4A illustrates a state of deformation representing the MEMS device in a mode corresponding to the same mode of operation as that illustrated in FIG. 3B. It can be seen that in addition to the deformation of the inner coupler 112 described previously in connection with FIG. 3B, the beams 402 and 408 flex downward, in the negative y-direction, and thus bars 406 and 410 are displaced in the negative y-direction relative to their equilibrium positions. The flexural rectangles 404 and 412 also displace in the negative y-direction as shown. Thus, the momentum of the coupler 112 in the positive y-direction is offset by the momentum of the end couplers in the negative y-direction. Accordingly, momentum balanced operation is provided for the MEMS device, together with the linear anti-phase motion allowed or enforced by the linearly moving flexural couplers.

FIG. 4B illustrates deformation of the device of FIG. 4A during linear anti-phase motion of the proof masses along the y-direction, for example corresponding to the mode of operation described previously in connection with FIG. 3C. In this instance, the end couplers 414 and 416 provide momentum balance for the inner coupler 112. While the end couplers 414 and 416 move linearly in the x-direction, they are free to move in the y-direction to allow the type of motion shown in FIG. 4A, which is independent from and orthogonal to the motion in FIG. 4B. Although not shown in FIG. 4B, in a complete gyroscope, such as that shown in FIG. 1, the flexural rectangles 404 and 412 may move in the negative x-direction, opposite to the motion of the corner couplers 116, providing complete momentum balance.

The momentum-balanced operation of the couplers in FIGS. 4A-4B may be beneficial in at least some embodiments. For example, such momentum-balanced couplers may be substantially insensitive or immune to acceleration, thus facilitating accurate operation of the MEMS device as a gyroscope.

Figure 5:
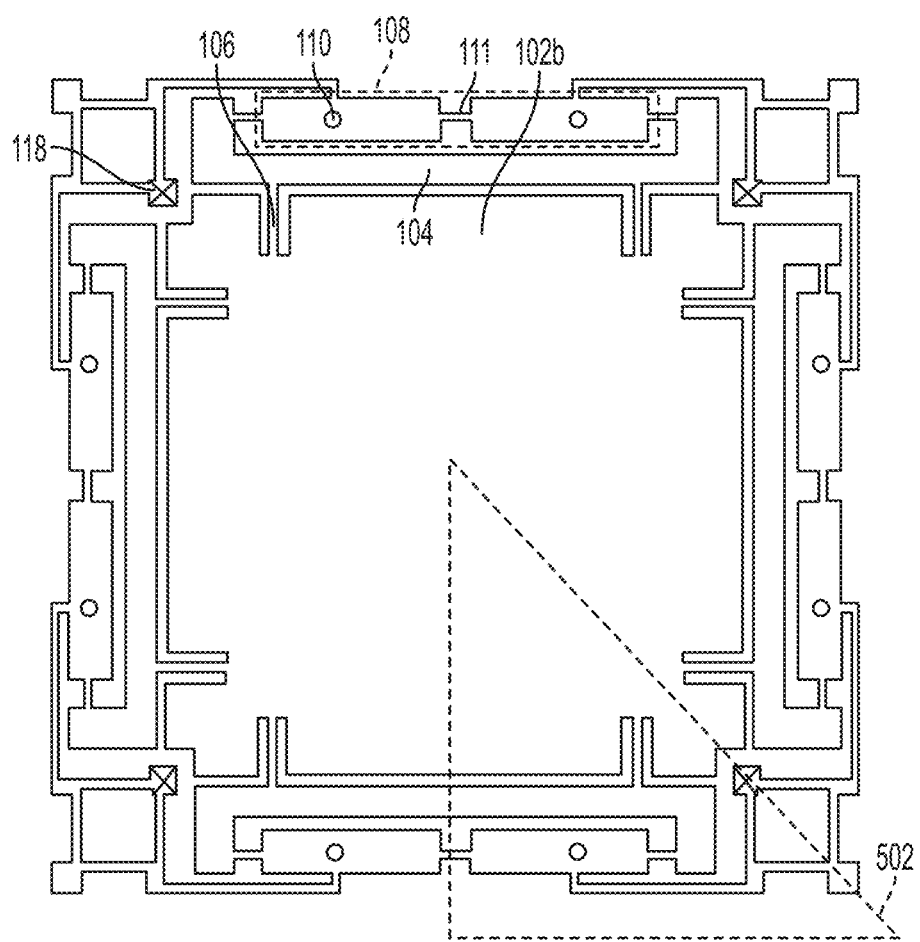
FIG. 5 illustrates a detail of one quadrant of the device of FIG. 1, showing the symmetry of the device.

FIG. 5 illustrates a detail of one quadrant of the MEMS device of FIG. 1, showing the symmetry of the device. Specifically, FIG. 5 illustrates the upper-right quadrant of the MEMS device 100, including the proof mass 102b. The MEMS device 100 includes four replicas of the illustrated quadrant. Moreover, the illustrated quadrant itself comprises eight substantially identically segments 502. Thus, the MEMS device 100 is effectively a compilation of replicating the segment 502 thirty-two times. The potentially symmetric nature of the MEMS device 100 may facilitate design and fabrication.

Figure 6A:
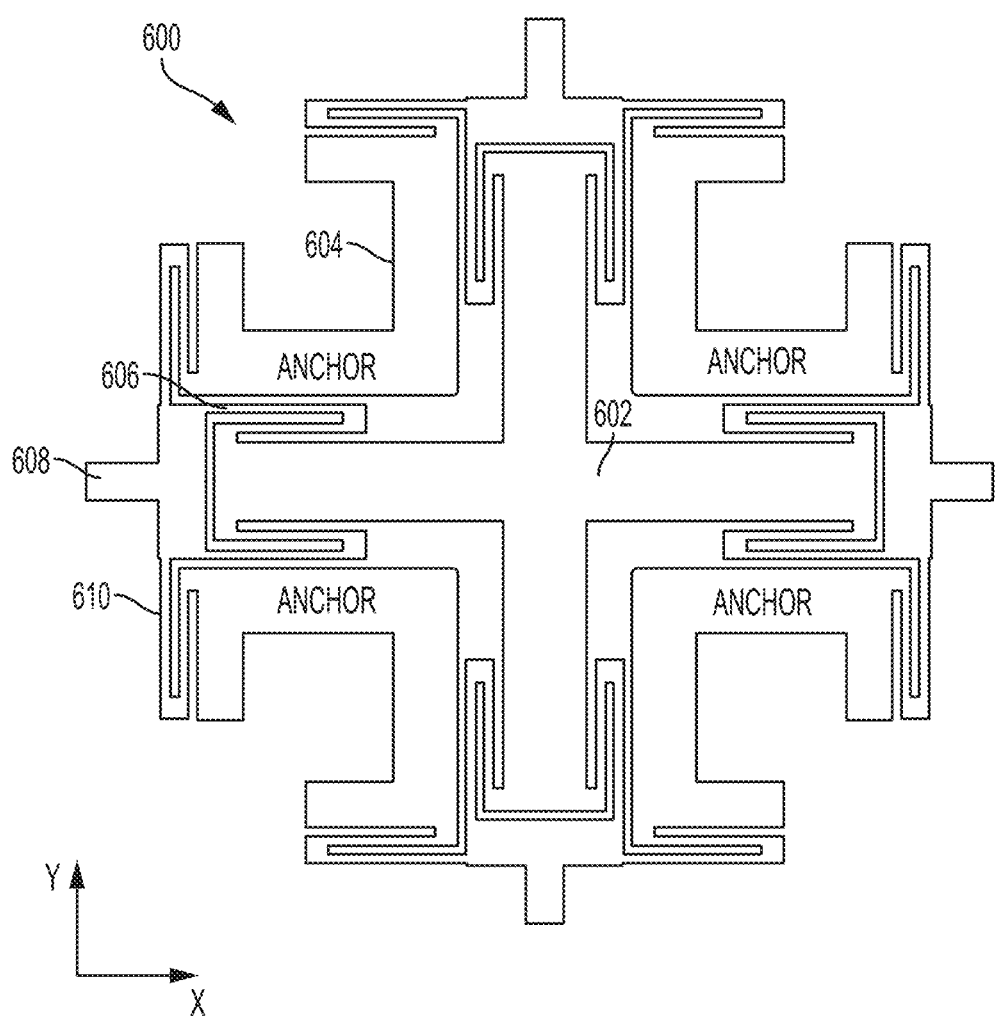
FIGS. 6A-6C illustrate alternative configurations of planar flexural inner couplers providing two degrees of freedom of motion.
Figure 6B:
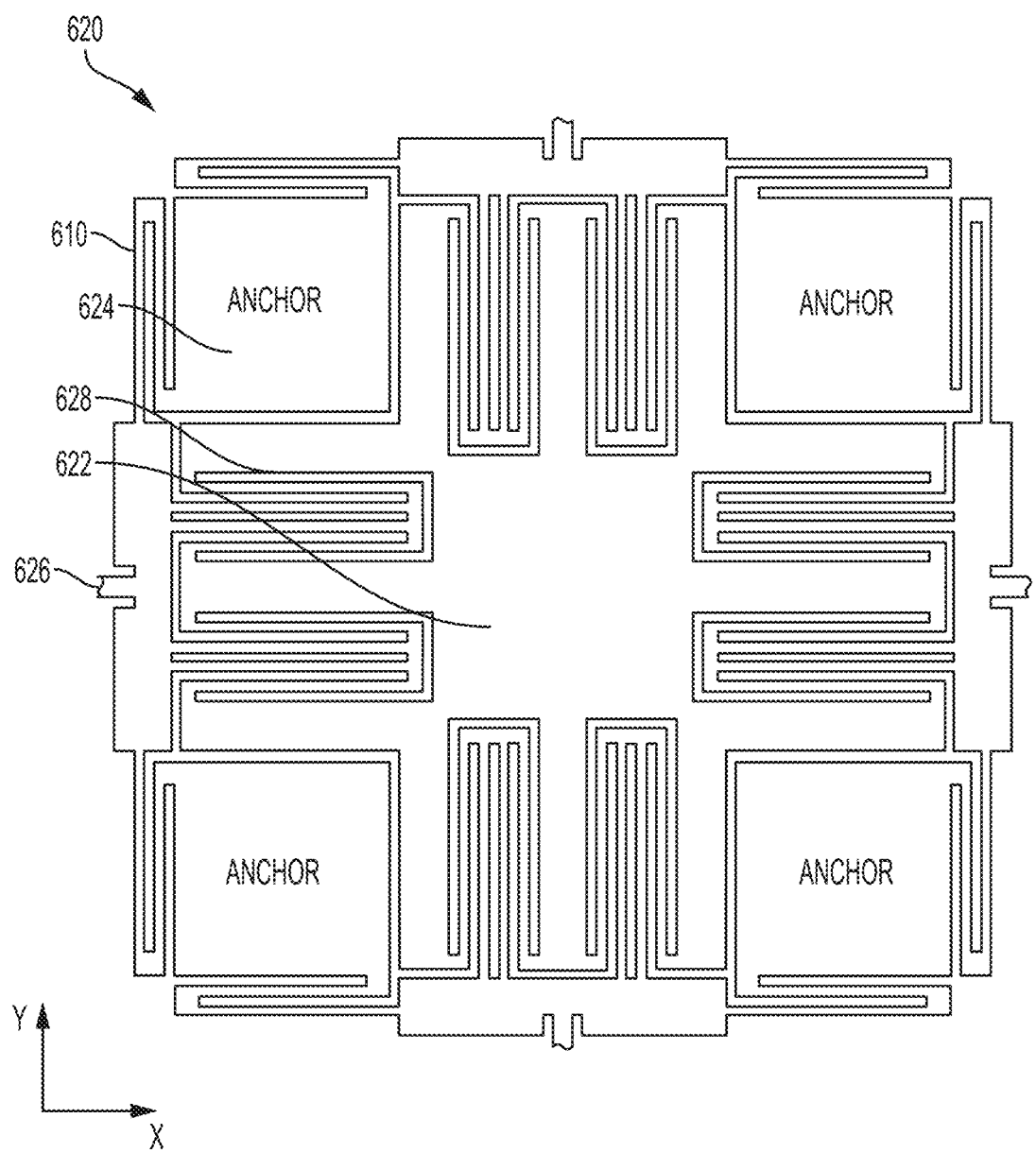
Figure 6C:
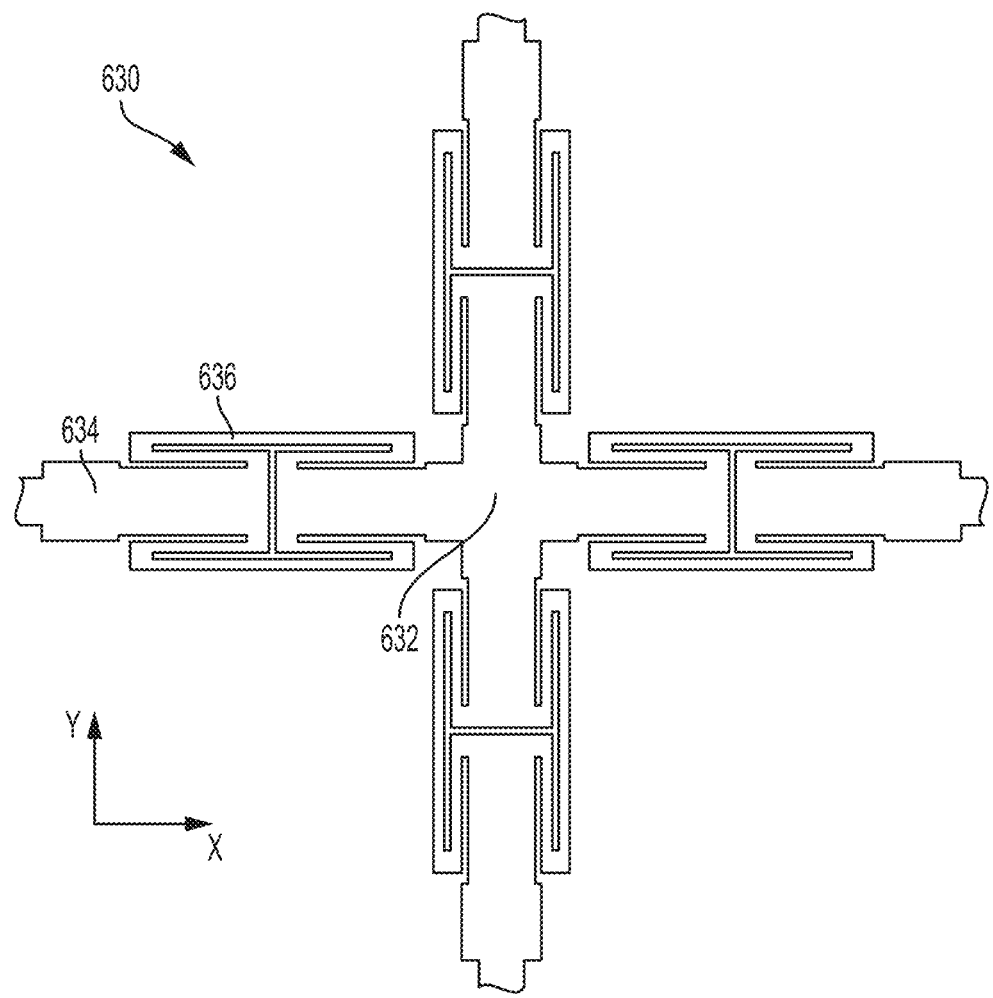

As described previously, the inner coupler 112 represents a non-limiting example of a two degree of freedom flexural coupler. FIGS. 6A-6C illustrate alternative configurations. Each of the couplers illustrated in these figures may be positioned between four proof masses to couple together the masses and enforce linear anti-phase motion of the masses.

FIG. 6A illustrates a two degree of freedom coupler 600 utilizing folded springs. The coupler 600 includes a cross-shaped center portion 602 connected to four anchors 604 by respective folded springs 606. There are eight folded springs 606 coupling the center portion 602 to the anchors 604. The coupler 600 also includes four bars 608 coupled to the anchors 604 by folded springs 610.

The coupler 600 may be disposed between and couple four proof masses, as in the manner of inner coupler 112. That is, the four bars 608 may connect to pivoting linkages (e.g., pivoting linkages 108) in the manner described previously in connection with the bars 306a-306d of FIG. 3A. The folded springs 606 and 610 may reduce non-linear effects that can result from the straight flexural beams of the inner coupler 112 when experiencing linear motion. The folded springs may more generally represent unidirectional springs, in that they allow motion in one direction but not others. In this manner, the motion of the bars 608 oriented along the x-direction may be decoupled from the motion of the bars 608 oriented along the y-direction. When used in gyroscopic operation, as shown in FIG. 1, the cross-shaped coupler 602 is allowed to move in two degrees of freedom while the four bars 608 coupled to it are moving linearly in one direction (one degree of freedom).

FIG. 6B illustrates a further alternative coupler providing linear movement in two decoupled degrees of freedom. The coupler 620 differs from the coupler 600 in that double-folded springs are included. The illustrated double-folded springs represent an example of a unidirectional spring. The coupler 620 includes a center portion 622, four anchors 624, folded springs 610, four bars 626, and double-folded springs 628. As shown, two double-folded springs 628 are provided on each side of the center portion 622. By including two such double-folded springs 628, a momentum balancing outer coupler will still have a double-folded spring, not just a single folded spring. As with coupler 600, the coupler 620 may reduce non-linear effects that can arise during operation of a coupler having the construction of coupler 112.

FIG. 6C illustrates a further alternative for a linearly moving two degree of freedom coupler which may be positioned between and couple together four proof masses to enforce linear anti-phase motion of the proof masses. The coupler 630 lacks anchors, in contrast to couplers 112, 600, and 620. A cross-shaped center portion 632 is coupled to four outwardly projecting bars 634 by two folded springs 636, which represent an example of a unidirectional spring. This construction, like that of FIGS. 6A and 6B, may inhibit non-linear effects better than the inner coupler 112. However, the coupler 630 may exhibit lower de-coupling of motion in the x and y-directions than the configurations having anchors.

Figure 7:
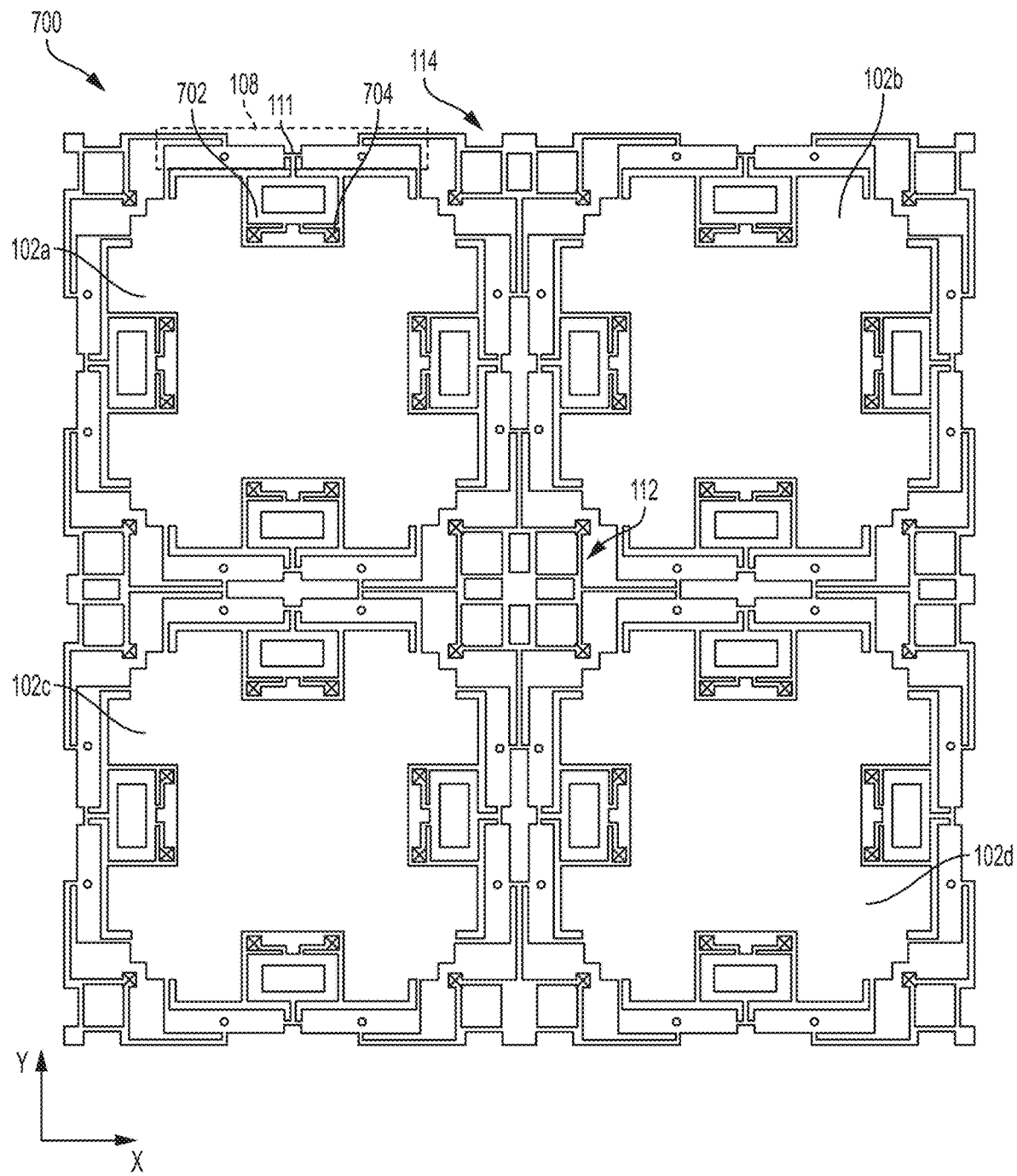
FIG. 7 illustrates an alternative device to that of FIG. 1, in which the pivoting linkages are directly coupled to the proof masses.

Further variations of the MEMS device 100 of FIG. 1 are possible. For example, a MEMS device having one or more linearly moving flexural couplers of the types described herein may lack shuttles. FIG. 7 illustrates a non-limiting example. The MEMS device 700 includes many of the same components previously described in connection with MEMS device 100 of FIG. 1. However, instead of shuttles 104, the MEMS device 700 includes frames 702. Each of the illustrated frames 702, of which there are sixteen, is tethered to two anchors 704 of the type previously described in connection with anchors 118. The frames 702 are smaller than shuttles 104, for example being narrower in this non-limiting embodiment. The frames 702 connect to the connector of the pivoting linkages 108. Also, the pivoting linkages 108 connect directly to the proof masses in MEMS device 700, in contrast to the configuration of MEMS device 100 in which the pivoting linkages couple to the shuttles 104. Because the frames may be made relatively small compared to the shuttles 104, the angular gain of the MEMS device 700 may be greater than that of MEMS device 100. Angular gain is the ratio of the mass responding to the angular rotation to the total modal mass of the sense mode. The configuration of MEMS device 700 provides an angular gain of approximately one. In some embodiments, angular gains greater than 0.85 may be provided, including any number between 0.85 and 1.

Figure 8:
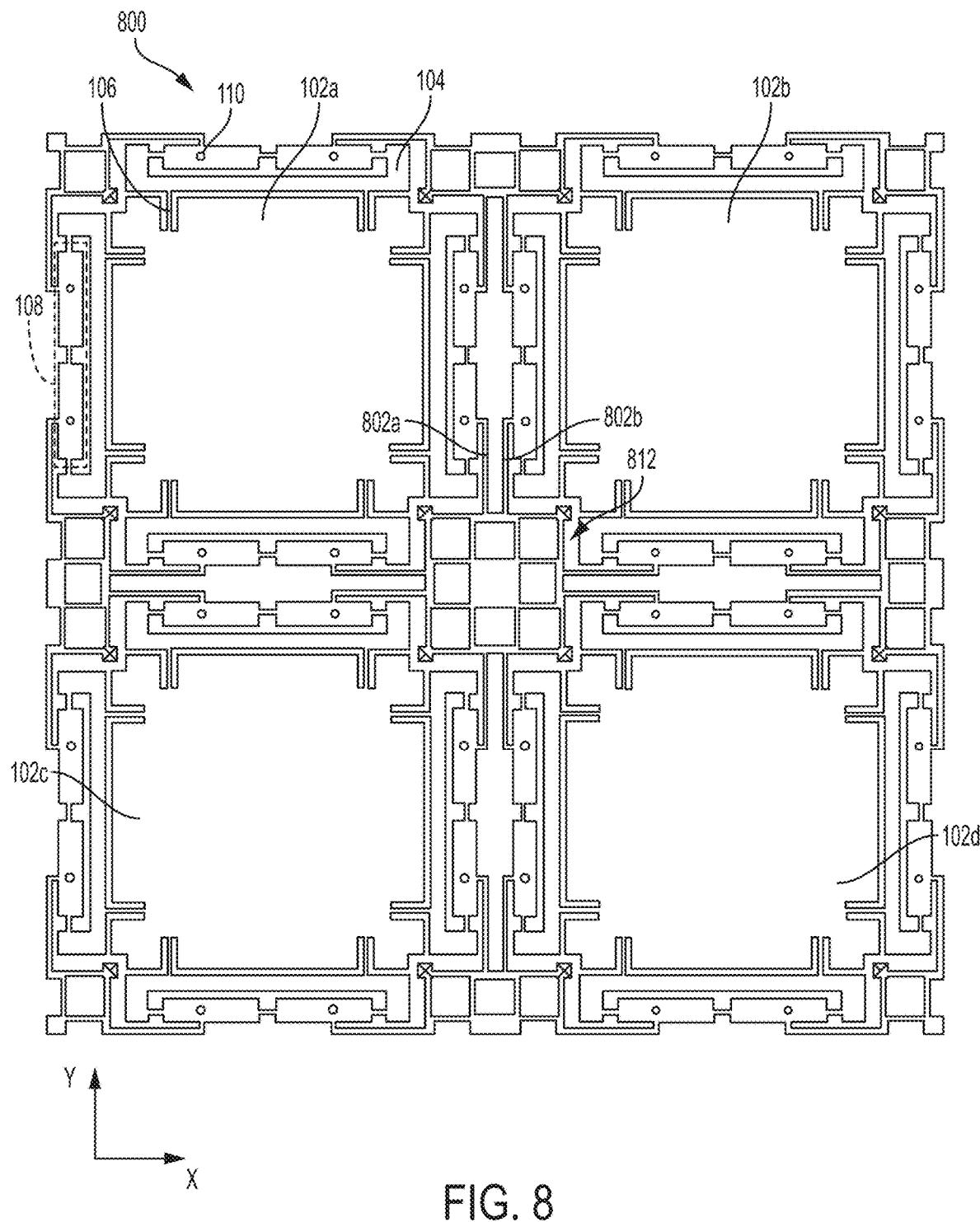
FIG. 8 illustrates an alternative device to that of FIG. 1, in which the linearly moving couplers couple to the pivoting linkages in a different manner, according to a non-limiting embodiment.

Still other alternatives of the MEMS device 100 are possible. FIG. 8 illustrates an alternative manner of coupling the pivoting linkages to provide greater momentum balance. In MEMS device 100, the pivoting linkages 108 facing each other are connected together, while the pivoting linkages positioned at the periphery of the proof mass arrangement are not coupled to their counterpart pivoting linkages by a common bar (or beam). For example, bar 306a couples together two pivoting linkages, as do bars 306b, 306c, and 306d. By contrast, the MEMS device 800 of FIG. 8 provides a respective bar coupling to each of the pivoting linkages. For example, the coupler 812 includes bars 802a and 802b coupling to pivoting linkages 108 facing each other. That is in contrast to the coupler 112 which included a single bar 306a. The form of coupling shown in FIG. 8 may be more susceptible to in-phase motion of the proof masses 102a-102d. However, greater momentum balance is provided for all modes of operation of the MEMS device.

As has been described previously, the linearly moving couplers described herein may be used with MEMS devices including more or fewer than four proof masses. For example, couplers such as the end couplers 414 and 416 may be used to couple together two proof masses. Also, more than four proof masses may be coupled together using the couplers described herein. Thus, examples described herein of coupling together four proof masses are not limiting of the various aspects described herein.

Figure 9:
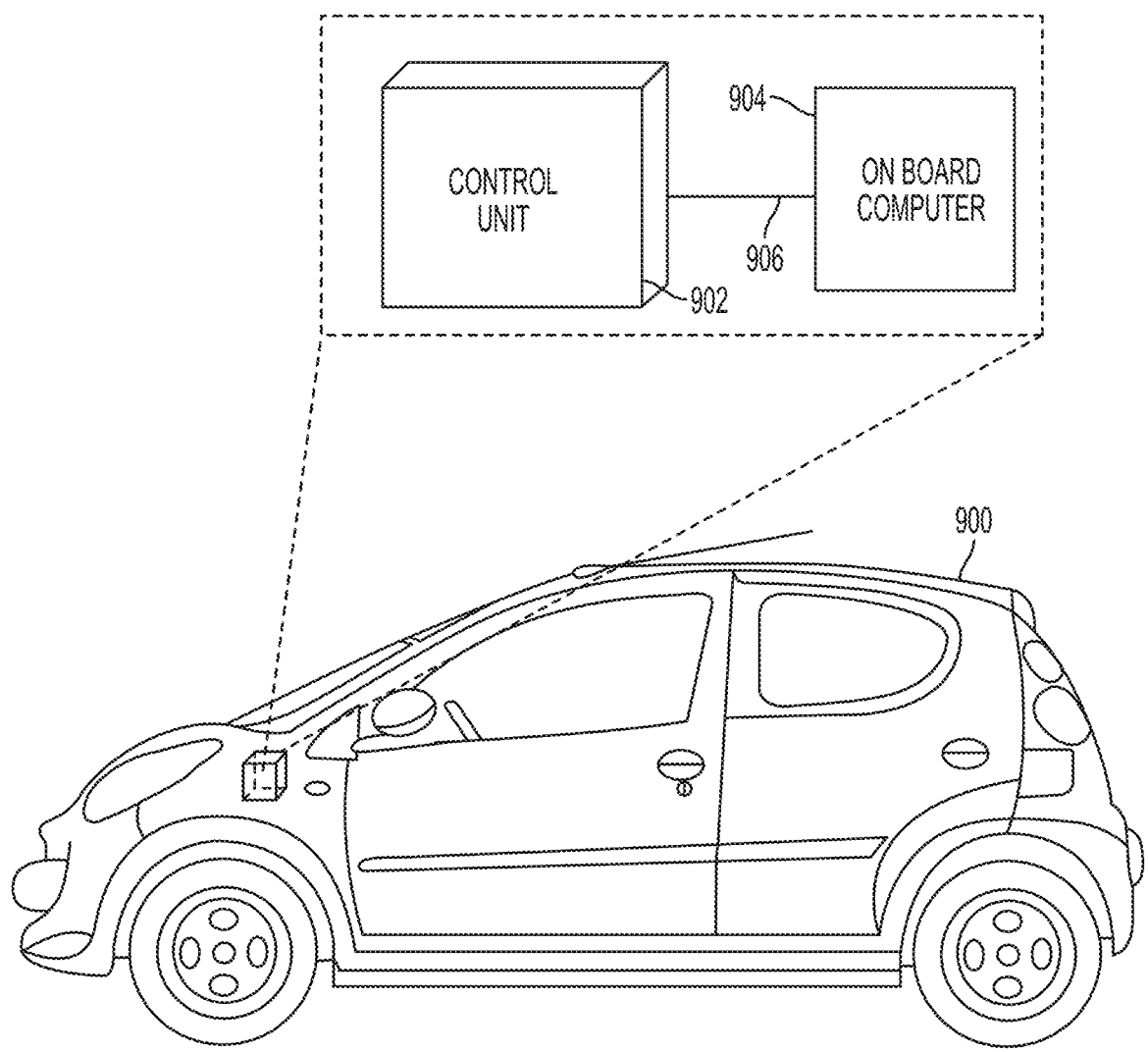
FIG. 9 illustrates an automobile which may employ MEMS devices of the types described herein, according to a non-limiting embodiment of the present application.

MEMS devices of the types described herein may be used in a variety of devices, products, and settings. One such setting is in vehicles, such as automobiles, boats, and aircraft. FIG. 9 illustrates an example in which a MEMS device the types described herein is employed in a car. In the example of FIG. 9, an automobile 900 includes a control unit 902 coupled to an onboard computer 904 of the car by a wired or wireless connection 906. Control unit 902 may comprise a MEMS sensor or MEMS device of the types described herein, optionally together with a power source, processing circuit, interface circuitry for communicating over the connection 906, or any other suitable components. As a non-limiting example, the control unit 902 may include a MEMS gyroscope of the types described herein. The MEMS gyroscope may sense yaw of the automobile 900, as an example. The control unit 902 may comprise a package or housing attached to a suitable part of the automobile 900, with the MEMS device inside. Control unit 902 may receive power and control signals from the onboard computer 904, and may supply sense signals to the onboard computer 904.

Another setting in which MEMS devices of the types described herein may be used is in sensor devices for sports applications, such as tennis, swimming, running, baseball, or hockey, among other possibilities. In some embodiments, a MEMS gyroscope of the types described herein may be part of a wearable fitness device. In other embodiments, the sensor may be part of a piece of sporting equipment, such as being part of a tennis racket, baseball bat, or hockey stick. Sense data from the sensor may be used to assess performance of the user.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The invention claimed is:

1. A microelectromechanical systems (MEMS) device having multiple coupled masses, comprising:
   first and second proof masses each configured to move linearly along a first axis in accordance with a drive mode and to move linearly along a second axis in accordance with a sense mode, the second axis being substantially orthogonal to the first axis; and a coupler coupling the first and second proof masses together and configured to move linearly along the first axis when the first and second proof masses move in accordance with the sense mode and to move linearly along the second axis when the first and second proof masses move in accordance with the drive mode.

2. The MEMS device of claim 1, wherein the MEMS device further comprises third and fourth proof masses coupled to the first and second proof masses in a synchronized mass configuration, and wherein the coupler enforces linear anti-phase motion of the first, second, third, and fourth proof masses along both the first and second axes.

3. The MEMS device of claim 2, wherein the coupler is flexible along both the first and second axes.

4. The MEMS device of claim 3, wherein the coupler comprises two rigid portions separated by a flexible portion.

5. The MEMS device of claim 4, wherein the coupler is disposed between the first, second, third, and fourth proof masses.

6. The MEMS device of claim 2, wherein the MEMS device is a MEMS gyroscope.

7. The MEMS device of claim 1, wherein the first and second proof masses are configured to move in linear anti-phase motion both in the drive mode and in the sense mode.

8. The MEMS device of claim 2, wherein the coupler is a first coupler and is disposed between the first, second, third, and fourth proof masses, and wherein the MEMS device further comprises a second coupler disposed between the first and second proof masses and a third coupler disposed between the third and fourth proof masses, wherein the second and third couplers in combination provide momentum balance with the first coupler.

9. The MEMS device of claim 1, wherein the coupler comprises a beam extending between the first and second proof masses.

10. The MEMS device of claim 1, wherein the first and second proof masses are suspended above a substrate, and wherein the coupler is coupled to the substrate by at least two anchors.

11. The MEMS device of claim 1, wherein the coupler comprises a beam coupled to a folded spring.

12. A synchronized mass microelectromechanical systems (MEMS) gyroscope, comprising:
first, second, third, and fourth proof masses arranged in a planar proof mass arrangement and coupled together, each of the first, second, third and fourth proof masses being configured to move linearly along a first axis in accordance with a drive mode and to move linearly along a second axis in accordance with a sense mode, the second axis being substantially orthogonal to the first axis; and
a flexural coupler disposed between the first, second, third, and fourth proof masses and coupled to the first, second, third, and fourth proof masses, the flexural coupler being configured to move linearly along the first axis when the first, second, third, and fourth proof masses move in accordance with the sense mode and to move linearly along the second axis when the first, second, third and fourth proof masses move in accordance with the drive mode.

13. The synchronized mass MEMS gyroscope of claim 12, wherein the coupler is configured to couple the first, second, third, and fourth proof masses in linear anti-phase motion in both the drive and sense modes.

14. The synchronized mass MEMS gyroscope of claim 12, wherein the coupler is a first coupler, and wherein the synchronized mass MEMS gyroscope further comprises second and third couplers, the second coupler coupling the first and second proof masses together and the third coupler coupling the third and fourth proof masses together, wherein the first, second, and third couplers are configured to be momentum balanced along the first axis.

15. The synchronized mass MEMS gyroscope of claim 14, wherein the second and third couplers are flexural couplers.

16. A method of operating a microelectromechanical systems (MEMS) device having multiple coupled masses, the method comprising:
moving a first proof mass and second proof mass linearly along a first axis, wherein moving the first proof mass and second proof mass linearly along the first axis comprises translating a first coupler coupling the first proof mass with the second proof mass linearly along a second axis substantially orthogonal to the first axis; and
sensing linear motion of the first proof mass and second proof mass along the second axis, wherein the linear motion of the first proof mass and second proof mass along the second axis coincides with linear translation of the first coupler along the first axis.

17. The method of claim 16, wherein the MEMS device comprises the first and second proof masses and third and fourth proof masses coupled with the first and second proof masses, wherein the method further comprises:
driving linear anti-phase motion of the first, second, third, and fourth proof masses along the first axis, wherein driving linear anti-phase motion of the first, second, third, and fourth proof masses along the first axis comprises linearly translating the first coupler along the second axis; and
sensing linear anti-phase motion of the first, second, third, and fourth proof masses along the second axis, wherein the linear anti-phase motion of the first, second, third, and fourth proof masses along the second axis coincides with linear translation of the first coupler along the first axis.

18. The method of claim 17, wherein linearly translating the first coupler comprises linearly translating the first coupler over an area between the first, second, third, and fourth proof masses.

19. The method of claim 16, further comprising linearly translating second and third couplers in a manner providing momentum balance with the first coupler.

20. The method of claim 17, wherein the first coupler is disposed between the first, second, third and fourth proof masses.

* * * * *